United States Patent
Reinhardt et al.

(10) Patent No.: US 12,418,409 B2
(45) Date of Patent: Sep. 16, 2025

(54) METHOD AND SYSTEM FOR SECURELY CONFIGURING A PLURALITY OF GATEWAY CONTROLLERS OF A VEHICLE

(71) Applicant: Bayerische Motoren Werke Aktiengesellschaft, Munich (DE)

(72) Inventors: Dominik Reinhardt, Munich (DE); Matthias Kessler, Munich (DE); Paul Seybold, Munich (DE); Nicola Coretti, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 45 days.

(21) Appl. No.: 18/579,673

(22) PCT Filed: Jul. 7, 2022

(86) PCT No.: PCT/EP2022/068893
§ 371 (c)(1),
(2) Date: Jan. 16, 2024

(87) PCT Pub. No.: WO2023/036493
PCT Pub. Date: Mar. 16, 2023

(65) Prior Publication Data
US 2024/0340162 A1 Oct. 10, 2024

(30) Foreign Application Priority Data
Sep. 9, 2021 (DE) .............. 10 2021 123 327.5

(51) Int. Cl.
*H04L 9/08* (2006.01)
*H04L 9/32* (2006.01)

(52) U.S. Cl.
CPC .......... *H04L 9/0825* (2013.01); *H04L 9/3247* (2013.01); *H04L 9/3263* (2013.01); *H04L 2209/84* (2013.01)

(58) Field of Classification Search
None
See application file for complete search history.

(56) References Cited

U.S. PATENT DOCUMENTS

| 8,195,945 | B2 * | 6/2012 | Andersson | G06F 21/79 |
| | | | | 713/175 |
| 9,215,228 | B1 * | 12/2015 | Zhang | H04L 63/08 |

(Continued)

FOREIGN PATENT DOCUMENTS

| CN | 106444568 A | 2/2017 |
| CN | 113259249 A | 8/2021 |

(Continued)

OTHER PUBLICATIONS

International Search Report corresponding to International Patent Application No. PCT/EP2022/068893, dated Nov. 3, 2022 (4 pages).

(Continued)

*Primary Examiner* — Backhean Tiv
(74) *Attorney, Agent, or Firm* — Maginot, Moore & Beck LLP

(57) ABSTRACT

A method is disclosed for securely configuring a plurality of gateway controllers of a vehicle. A reception request is received from a client interface of a first gateway controller, signed with a private key of a server interface of a second gateway controller, and a transmission offer is transmitted from the server interface of the second gateway controller to the client interface of the first gateway controller. The transmission offer includes a signed reception request that is verified. A confirmation message is received from the client interface of the first gateway controller. The confirmation message is signed and includes a confirmation/rejection of the transmitted transmission offer. The signed confirmation message is verified with a public key of the client interface of the first gateway controller. A routing table of the second gateway controller is configured depending on the received (Continued)

confirmation message when the signed confirmation message was successfully verified.

20 Claims, 3 Drawing Sheets

(56) References Cited

U.S. PATENT DOCUMENTS

| | | | | |
|---|---|---|---|---|
| 9,270,468 | B2* | 2/2016 | Alrabady | G06F 12/1408 |
| 9,769,658 | B2* | 9/2017 | Dolev | H04W 12/06 |
| 9,992,178 | B2* | 6/2018 | Jun | H04W 4/44 |
| 10,348,694 | B2* | 7/2019 | Cho | H04W 12/062 |
| 10,355,868 | B2* | 7/2019 | Cho | H04L 9/3242 |
| 11,665,004 | B2* | 5/2023 | Knopf | H04L 63/08 |
| | | | | 713/176 |
| 12,323,889 | B2* | 6/2025 | Gao | G06F 21/602 |
| 2010/0098095 | A1 | 4/2010 | Kato et al. | |
| 2016/0119163 | A1 | 4/2016 | Fadeev et al. | |
| 2017/0070488 | A1* | 3/2017 | Jun | H04L 9/0833 |
| 2017/0111177 | A1* | 4/2017 | Oguma | H04L 9/3273 |
| 2024/0340162 | A1* | 10/2024 | Reinhardt | H04L 63/126 |

FOREIGN PATENT DOCUMENTS

| | | |
|---|---|---|
| DE | 69737308 T2 | 9/2007 |
| EP | 3799349 A2 | 3/2021 |

OTHER PUBLICATIONS

Written Opinion corresponding to International Patent Application No. PCT/EP2022/068893, dated Nov. 3, 2022 (8 pages).
German Search Report corresponding to German Patent Application No. 10 2021 123 327.5, dated Aug. 1, 2022. (5 pages).

* cited by examiner

METHOD AND SYSTEM FOR SECURELY CONFIGURING A PLURALITY OF GATEWAY CONTROLLERS OF A VEHICLE

CROSS-REFERENCE TO RELATED APPLICATIONS

The present application is the U.S. national phase of PCT Application PCT/EP2022/068893 filed on Jul. 7, 2022, which claims priority of German patent application No. 102021123327.5 filed on Sep. 9, 2021, the entire contents of which are incorporated herein by reference.

FIELD

This disclosure relates to the field of vehicles, and particularly to a system and method for securely configuring a plurality of gateway controllers of a vehicle.

BACKGROUND

Vehicles are well known in the art and typically comprise a vehicle chassis, passenger compartment, engine and/or propulsion motor, transmission, and traction members such as tires, amongst other common components. Vehicles comprise a plurality of controllers which can communicate with one another via various bus systems. For this purpose, the controllers are communicatively connected to one another via a central gateway controller. The central gateway controller number has a of communication interfaces defined for a specific vehicle. An extension of the communication interfaces and flexible utilization of the communication interfaces of the central gateway controller are often not possible.

SUMMARY

In view of the foregoing, it would be advantageous to efficiently couple a plurality of controllers in a vehicle to one another. In particular, it would be advantageous to securely couple a plurality of gateway controllers in a vehicle to one another. More particularly, it would be advantageous to efficiently and/or securely configure a plurality of gateway controllers.

In accordance with a first embodiment of the disclosure, a method is disclosed securely configuring a plurality of gateway controllers of a vehicle. The method can be a computer-implemented method and/or a controller-implemented method. The gateway controller can be a controller on which a software module which implements the method is executed. The vehicle can be a motor vehicle. Preferably, the configuring comprises configuring a routing table of the gateway controller. The plurality of gateway controllers comprises at least two gateway controllers. A gateway controller is preferably connected to at least two bus systems. With further preference, a bus system of the at least two bus systems of a gateway controller is an Ethernet bus system. Further bus systems of a gateway controller can be one or more CAN bus systems, one or more LIN bus systems, one or more FlexRay bus systems, and/or one or more further Ethernet bus systems.

The method comprises receiving a reception request from a client interface of a first gateway controller by means of a server interface of a second gateway controller. The reception request can comprise one or more reception requests from one or more controllers which are connected to the first gateway controller via the further bus systems. The reception request preferably comprises all reception requests of all controllers which are connected to the first gateway controller. The reception request is preferably received by the second gateway controller via the Ethernet bus system of the first gateway controller. Each gateway controller preferably comprises a client interface and a server interface, which use the Ethernet bus system between the gateway controllers as a communication channel. Furthermore, the method comprises signing the reception request with a private key of the server interface of the second controller, and communicating a transmission offer from the server interface of the second gateway controller to the client interface of the first gateway controller, wherein the transmission offer comprises the signed reception request. The transmission offer can comprise one or more transmission offers from one or more e controllers which are connected to the second gateway controller via the further bus systems. Preferably, the transmission offer offers of all controllers comprises all transmission which are connected to the second gateway controller. Furthermore, the method comprises receiving a confirmation message from the client interface of the first gateway controller by means of the server interface controller, wherein the of the second gateway confirmation message comprises a confirmation or a rejection of the communicated transmission offer by the first gateway controller. Preferably, the confirmation message comprises a confirmation or a rejection for the signal of the communicated transmission offer by the first way controller. A element signal of the communicated transmission offer is intended to be a reception offer of a controller connected to the second gateway controller.

The method furthermore comprises verifying the signed reception request with a public key of the server interface of the second gateway controller by means of the client interface of the first gateway controller, receiving a confirmation message from the client interface of the first gateway controller by means of the server interface of the second gateway controller, wherein the confirmation message comprises a confirmation or a rejection of the communicated transmission offer by the first gateway controller, and wherein the confirmation message is signed with the private key of the client interface of the first gateway controller. The method verifies the signed confirmation message with a public key of the client interface of the first gateway controller by means of the server interface of the second gateway controller and configures a routing table of the second gateway controller depending on the received confirmation message by means of the second gateway controller if the signed confirmation message was successfully verified by the server interface of the second gateway controller.

Advantageously, a plurality of gateway controllers can be efficiently and securely configured automatically. The method can securely configure static communication relationships of all controllers connected to a gateway controller. In detail, the method can efficiently and securely configure routing tables for static communication relationships of the gateway controllers. Furthermore, the method can be carried out in parallel and automatically for all gateway controllers. Preferably, the method is carried out during a coding of the controllers of the vehicle. This makes it possible to ensure that the communication between the controllers and the gateway controllers is always kept up-to-date in an automated manner, without a manual configuration of the gateway controllers needing to be carried out. The gateway controllers can be configured flexibly and securely, thereby simplifying an adaptation to different vehicles and/ or vehicle derivatives and/or controller configurations of the vehicles and/or the vehicle derivatives. Manipulations of the routing tables of the gateway controllers can thus be efficiently prevented.

In accordance with one advantageous embodiment, the reception request can comprise a nonce value of the client interface of the first gateway controller. This enables replay attacks to be efficiently prevented and/or the security of the method to be increased further.

In accordance with a further, advantageous embodiment, the nonce value of the reception request can be signed with the private key of the server interface of the second controller. This enables replay attacks to be efficiently prevented and/or the security of the method to be increased further.

In accordance with a further, advantageous embodiment, the transmission offer can comprise the signed nonce value of the reception request, a nonce value of the server interface of the second gateway controller, and/or a public key certificate of the server interface. This enables the security of the method to be efficiently increased.

In accordance with a further, advantageous embodiment, the method can furthermore comprise verifying the public key certificate of the server interface of the second gateway controller with a public root key by means of the client interface of the first gateway controller. This enables the security of the method to be efficiently increased.

In accordance with a further, advantageous embodiment, the confirmation message can comprise a public key certificate of the client interfaces of the first gateway controller and a nonce value signed with the private key of the client interface of the first gateway controller, and/or a nonce value of the client interface of the first gateway controller of the confirmation message can be signed with the private key of the client interface of the first gateway controller. This enables the security of the method to be efficiently increased.

In accordance with a further, advantageous embodiment, the method can furthermore comprise verifying the public key certificate of the client interface of the first gateway controller with the public root key by means of the server interface of the second gateway controller. This enables the security of the method to be efficiently increased.

In accordance with a further, advantageous embodiment of the disclosure, each gateway controller can be connected to one or more controllers via a first bus system, such as CAN, for example, and/or each gateway controller can be connected to one or more gateway controllers via a second bus system, such as Ethernet, for example. By this means, central networking of the gateway controllers is avoided and flexible and networking dynamic of controllers and gateway controllers is implemented.

In accordance with a further, advantageous embodiment of the disclosure, the method can furthermore comprise adapting the reception request depending on the confirmation message by means of the first gateway controller. This enables already fulfilled reception requests of the controllers to be removed from the reception request of the first gateway controller. If the reception request of the first gateway controller comprises no more reception requests from controllers, all reception requests of the first gateway controller have been fulfilled and the configuration of the first gateway controller has been successfully concluded.

In accordance with a further, advantageous embodiment of the disclosure, the method can furthermore comprise determining a transmission/reception specification of a controller by means of the first gateway controller, wherein the controller is connected to the first gateway controller via a first bus system. Furthermore, the method can comprise creating the reception request depending on a reception specification of the determined transmission/reception specification of the controller by means of the first gateway controller, and/or creating the transmission offer depending on a transmission specification of the determined transmission/reception specification of the controller by means of the first gateway controller. This enables a reception request of a gateway controller to be created efficiently.

In accordance with a further, advantageous embodiment of the disclosure, the method can furthermore comprise determining a transmission/reception specification of a controller by means of the second gateway controller, wherein the controller is connected to the second gateway controller via a first bus system, and/or creating the transmission offer depending on a transmission specification of the determined transmission/reception specification of the controller by means of the second gateway controller. This enables a transmission offer of a gateway controller to be created efficiently.

In accordance with a further, advantageous embodiment of the disclosure, the method can comprise setting up a communication connection between the client interface of the first gateway controller and the server interface of the second gateway controller via the second bus system, wherein the communication preferably takes place dynamically using a service discovery communication protocol of the second bus system. This enables an exchange of the reception request and the transmission offer between two gateway controllers to be started efficiently.

In accordance with a further, advantageous embodiment of the disclosure, the method can furthermore comprise receiving a reception request from a client interface of a third gateway controller by means of a server interface of a first gateway controller, communicating the transmission request from the server interface of the first gateway controller to the client interface of the third gateway controller, receiving a confirmation message from the client interface of the third gateway controller by means of the server interface of the first gateway controller, wherein the confirmation message comprises a confirmation or a of rejection the communicated transmission offer by the first gateway controller, and configuring a routing table of the first gateway controller depending on the received confirmation message by means of the third gateway controller. This enables the routing table of the first gateway controller to be configured efficiently.

In accordance with a further, advantageous embodiment of the disclosure, the method can comprise disconnecting the communication connection between the client interface of the first gateway controller and the server interface of the second gateway controller via the second bus system if the client interface of the first controller has communicated a confirmation message for all reception requests to the server interface of the second gateway controller. This enables the exchange of the reception request and the transmission offer between two gateway controllers to be ended efficiently. The configuration is ended with the disconnection of the communication connection between the two gateway controllers.

In accordance with a further aspect, the disclosure is distinguished by a computer-readable medium for configuring a plurality of gateway controllers of vehicle, wherein the computer-readable medium comprises instructions which, when executed on a computer and/or a controller, carry out the method described above.

In accordance with a further aspect, the disclosure is distinguished by a system for configuring a plurality of gateway controllers of a vehicle, wherein the system is designed to carry out the method described above.

In accordance with a further aspect, the disclosure is distinguished by a vehicle comprising the above-described system for configuring a plurality of gateway controllers of the vehicle.

It will be recognized that controllers are commonly used in vehicles or in association with vehicle testing. Controllers (which may also be referred to as "control units," "processors" or "microprocessors") include circuits (e.g., integrated circuits) that contain typical functionality of central processing units (CPU) and are configured to perform various calculations and analysis based on manufacturer programming and/or circuit components. Examples of controllers used in vehicles include gateway controllers and/or any of various Engine Control Units (ECNs) commonly used by different manufacturers in modern automobiles.

Further features of the disclosure are evident from the claims, the figures and the description of the figures. All features and feature combinations mentioned above in the description and the features and feature combinations mentioned below in the description of the figures and/or shown solely on the figures are usable not only in the combination indicated in each case, but also in other combinations or else by themselves.

BRIEF DESCRIPTION OF THE DRAWINGS

A preferred exemplary embodiment of the disclosure is described below with reference to the accompanying drawings. Further details, preferred embodiments and developments of the disclosure are evident therefrom. Specifically, in the figures schematically.

DETAILED DESCRIPTION

Figure 1:
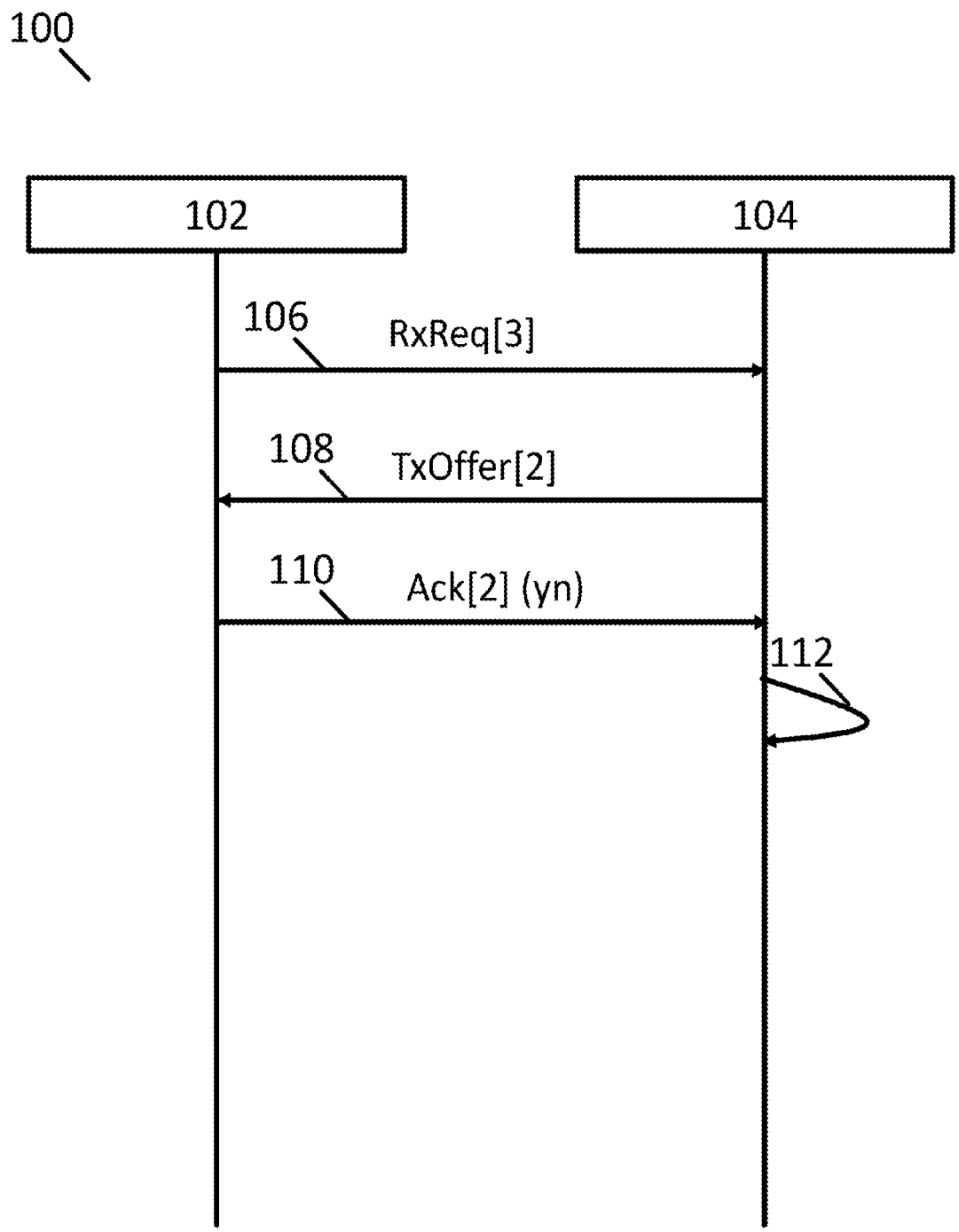
FIG. 1 shows an exemplary method for configuring a plurality of gateway controllers of a vehicle.

With reference now to FIG. 1, an exemplary method 100 is illustrated for configuring a plurality of gateway controllers of a vehicle. A gateway controller of the plurality of gateway controllers can have a client interface and a server interface. Preferably, each gateway controller the of plurality of gateway controllers comprises a client interface and a server interface. A gateway controller of the vehicle, preferably each gateway controller of the vehicle, can be configured by means of the client interface and the server interface. The method 100 can be carried out between two gateway controllers. More precisely, the method can be carried out between a client interface 102 of a first gateway controller and a server interface 104 of a second gateway controller and/or between a server interface of the first gateway controller and a client interface of the second gateway controller.

The method 100 can receive 106 a reception request from a client interface of a first gateway controller by means of a server interface of a second gateway controller. As shown in FIG. 1, the client interface 102 of the first gateway controller can communicate/transmit the reception request RxReq to the server interface 104 of the second gateway controller. The exemplary reception request RxReq[3] indicates that a list of three reception requests is communicated in a message from the client interface 102 of the first gateway controller to the server interface 104 of the second gateway controller. Alternatively, each reception request can be communicated in an individual message.

The method 100 can communicate/transmit 108 a transmission offer TxOffer from the server interface 104 of the second gateway controller to the client interface of the gateway first controller. The exemplary transmission offer TxOffer[2] indicates that a list of two transmission offers is communicated in a message from the server interface 104 of the second gateway controller to the client interface 102 of the first gateway controller. Alternatively, each reception request can be communicated in an individual message. Alternatively, each transmission offer can be communicated in an individual message.

Furthermore, the method can 100 receive 110 a confirmation message from the client interface 102 of the first gateway controller by means of the server interface 104 of the second gateway controller. As shown in FIG. 1, the client interface 102 of the first gateway controller can communicate/transmit the confirmation message Ack to the server interface 104 of the second gateway controller. The confirmation message can comprise a confirmation "y" or a rejection "n" of the communicated transmission offer by the first gateway controller. Finally, the method 100 can configure 112 a routing table of the second gateway controller depending on the received confirmation message by means of the second gateway controller. By way of example, in the routing table of the second controller for each confirmed transmission offer an entry is included stipulating that an associated signal and/or an associated message of a controller connected to the second gateway controller will be forwarded to the first gateway controller.

Figure 2:
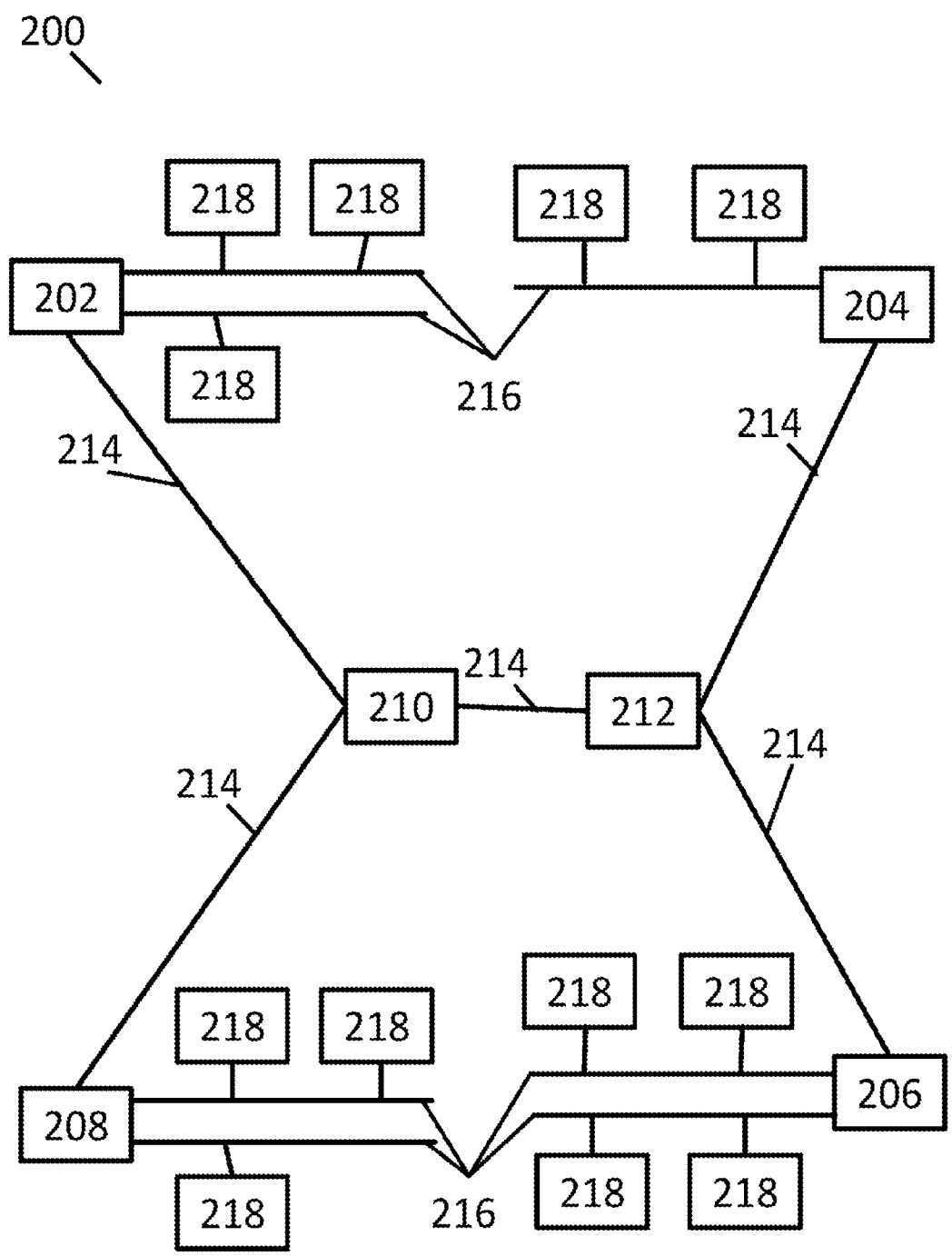
FIG. 2 shows an exemplary system for configuring a plurality of gateway controllers of a vehicle.

In detail, FIG. 2 shows an exemplary system 200 for configuring a plurality of gateway controllers of a vehicle. The system 200 comprises multiple gateway controllers 202, 204, 206, 208, 210, 212. The gateway controllers 202 to 208 can be assigned to different functional zones of a vehicle. The gateway controllers 210, 212 can integrate and/or communicatively interlink the gateway controllers 202 to 208 of the different functional zones of the vehicle. Preferably, the gateway controllers 202 to 212 are connected to one or more Ethernet bus systems. The gateway controllers 202 to 208 of the respective functional zones can have one or more bus systems 216, to which one or more controllers 218 are connected. Each controller gateway can request a transmission/reception specification from each controller connected to the respective gateway controller. Preferably, the plurality of gateway controllers are configured during a coding of the vehicle during production of the vehicle. Alternatively, each controller can communicate a transmission/reception specification to the respective gateway controller after start-up or after an initial configuration. By way of example, the plurality of gateway controllers can be reconfigured in the event of an exchange of a gateway controller, in the event of an exchange of a controller, and/or in the event of a software update. Each gateway controller 202 to 212 can have a client interface and a server interface. A client interface of a gateway controller can discover one or more server interfaces of one or more further gateway controllers by means of a service discovery protocol, for example by means of the Some/IP protocol. For each of the server interfaces discovered, the method 100 can be carried out in order to configure the routing tables of the server interfaces and to fulfil the reception request of the respective client interface. The method 200 can thus be configured in an automated manner so that the reception requests of all controllers 218 of the system 200 are fulfilled.

Advantageously, the method and the system, in an automated manner, can configure reception requests from controllers and gateway controllers in an automated manner by negotiation of the reception request and the transmission offer between in each case two gateway controllers, for example a client interface of the first controller and a server interface of the second gateway controller. The communication requests between the gateway controllers can thus be configured efficiently and flexibly.

Figure 3:
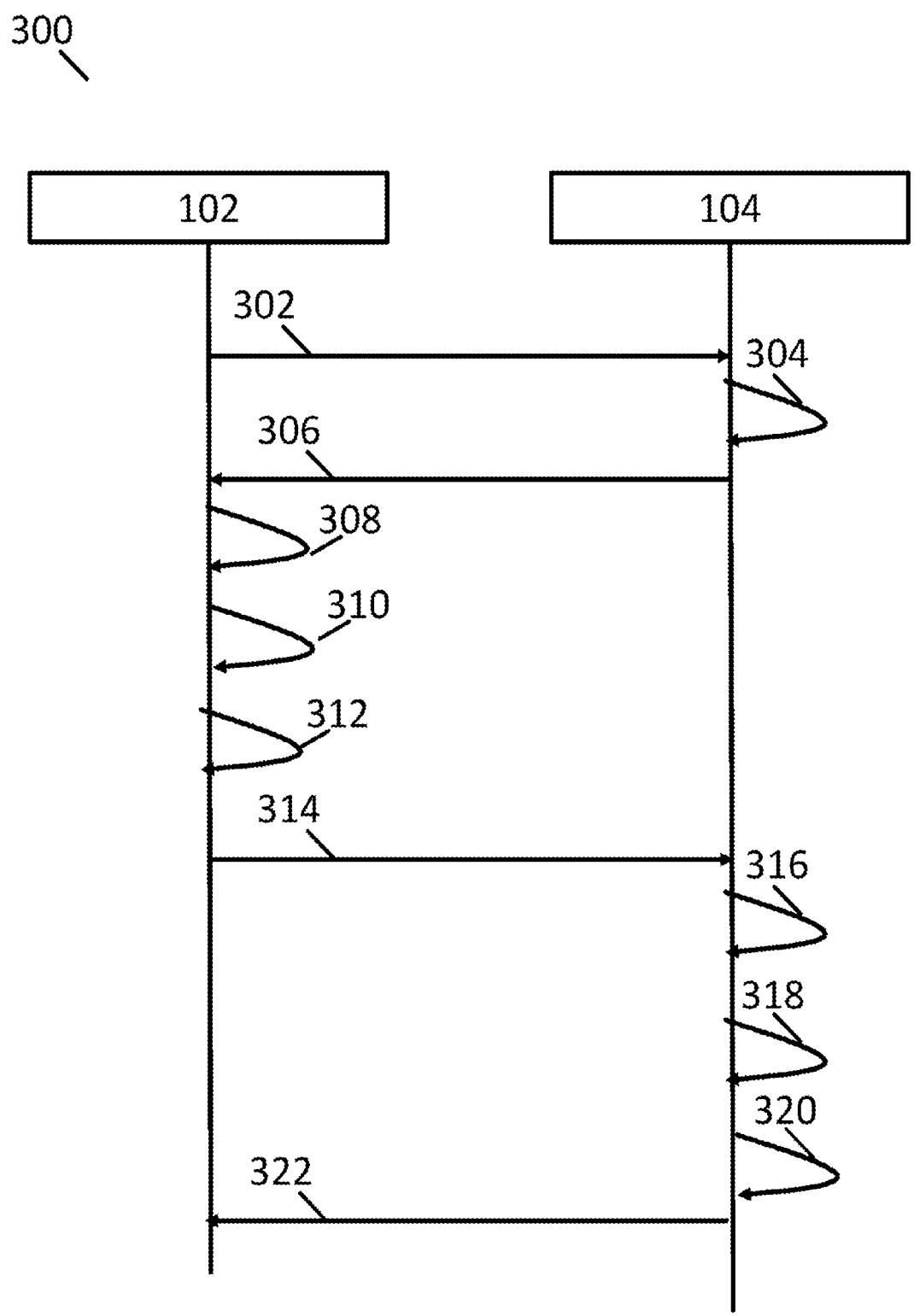
FIG. 3 shows an method exemplary for securely configuring a plurality of gateway controllers.

In detail, FIG. 3 shows an exemplary method 300 for securely configuring a plurality of gateway controllers of a vehicle. The method 300 can be carried out between two gateway controllers. More precisely, the method can be carried out between a client interface 102 of a first gateway controller and a server interface 104 of a second gateway controller and/or between a server interface of the first gateway controller and a client interface of the second gateway controller.

The method 300 can receive 302 a reception request from a client interface 102 of the first gateway controller by means of the server interface 104 of the second gateway controller. The reception request can comprise reception request data and a nonce value of the client interface 102. The nonce value can be a combination of numbers and/or letters which is used only once in a respective context. By way of example, the nonce value can be a number which is increased upon each reception request. The method 300 can comprise signing 304 the reception request with a private key of the server interface 104 of the second controller. In particular, the method can sign the received nonce value of the client interface 102 with the private key of the server interface 104.

Furthermore, the method 300 can communicate 306 a transmission offer from the server interface 104 of the second gateway controller to the client interface 102 of the first gateway controller. The transmission offer can comprise the signed reception request. In detail, the transmission offer can comprise transmission offer data, a public key certificate of the server interface 104, the signed nonce value of the client interface 102, and/or a nonce value of the server interface 104.

The method 300 can verify 308 the signed reception request, in particular the signed nonce value of the client interface 102 of the reception request, with a public key of the server interface 104 of the second gateway controller by means of the client interface 102 of the first gateway controller. Furthermore, the client interface 102 can verify 310 the public key certificate of the server interface 104 with a public root certificate. Furthermore, the client interface 102 can sign 312 the nonce value of the server interface 104 with a private key of the client interface 102.

The method 300 can comprise communicating and/or receiving 314 a confirmation message from the client interface of the first gateway controller by means of the server interface of the second gateway controller. The confirmation message can comprise a confirmation or a rejection of the communicated transmission offer by the first gateway controller. The confirmation message can be signed with the private key of the client interface of the first gateway controller. In detail, the confirmation message can comprise data regarding the confirmation and/or the rejection of the communicated transmission offer. Furthermore, the confirmation message can comprise a public key certificate of the client interface and/or the signed nonce value of the server interface 104.

The method 300 can verify 316 the signed confirmation message, in particular the signed nonce value of the confirmation message, with a public key of the client interface 102 of the first gateway controller by means of the server interface 104 of the second gateway controller. Furthermore, the server interface 104 can verify 318 the public key certificate of the client interface 102 with a public root certificate.

The method 300 can configure 320 a routing table of the second gateway controller depending on the received confirmation message by means of the second gateway controller, in particular by means of the server interface 104 of the second gateway controller, if the signed confirmation message was successfully verified by the server interface 104 of the second gateway controller. Optionally, the server interface 104 can communicate 322 a confirmation message regarding the confirmation of the routing table to the client interface 102.

Advantageously, the configuring of the routing tables of the gateway controllers can be efficiently safeguarded against manipulation of the messages. The security of the controllers and of the gateway controllers and also the communication between the controllers and the gateway controllers can thus be efficiently increased.

LIST OF REFERENCE SIGNS

100 Method
102 Communicating/receiving a reception request
104 Communicating a transmission offer
106 Communicating/receiving a confirmation message
108 Configuring a routing table
200 System
202 Gateway controller
204 Gateway controller
206 Gateway controller
208 Gateway controller
210 Gateway controller
212 Gateway controller
214 Ethernet bus system
216 Bus system
218 Controller
300 Method
302 Receiving a reception request
304 Signing the nonce value of the client interface
306 Communicating the transmission offer
308 Verifying the signed reception request
310 Verifying the public key certificate
312 Signing the nonce value of the server interface
314 Receiving a confirmation message
316 Verifying the signed confirmation message
318 Verifying the public key certificate
320 Configuring the routing table
322 Communicating a confirmation message

What is claimed is:

1. A method for securely configuring a plurality of gateway controllers of a vehicle, the method comprising:
receiving a reception request from a client interface of a first gateway controller by means of a server interface of a second gateway controller;
signing the reception request with a private key of the server interface of the second gateway controller;
transmitting a transmission offer from the server interface of the second gateway controller to the client interface of the first gateway controller, wherein the transmission offer comprises a signed reception request;

verifying the signed reception request with a public key of the server interface of the second gateway controller by means of the client interface of the first gateway controller;

receiving a confirmation message from the client interface of the first gateway controller by means of the server interface of the second gateway controller, wherein the confirmation message comprises a confirmation or a rejection of the transmitted transmission offer by the first gateway controller, wherein the confirmation message is signed with a private key of the client interface of the first gateway controller;

verifying the signed confirmation message with a public key of the client interface of the first gateway controller by means of the server interface of the second gateway controller; and configuring a routing table of the second gateway controller depending on the received confirmation message by means of the second gateway controller when the signed confirmation message was successfully verified by the server interface of the second gateway controller.

2. The method as claimed in claim 1, wherein the reception request comprises a nonce value of the client interface of the first gateway controller.

3. The method as claimed in claim 1, wherein the nonce value of the reception request is signed with the private key of the server interface of the second gateway controller.

4. The method as claimed in claim 1, wherein the transmission offer comprises the signed nonce value of the reception request, a nonce value of the server interface of the second gateway controller, and/or a public key certificate of the server interface.

5. The method as claimed in claim 4, the method further comprising:
verifying the public key certificate of the server interface of the second gateway controller with a public root key by means of the client interface of the first gateway controller.

6. The method as claimed in claim 1, wherein the confirmation message comprises a public key certificate of the client interfaces of the first gateway controller and a nonce value signed with the private key of the client interface of the first gateway controller; and/or
wherein a nonce value of the client interface of the first gateway controller of the confirmation message is signed with the private key of the client interface of the first gateway controller.

7. The method as claimed in claim 6, the method further comprising:
verifying the public key certificate of the client interface of the first gateway controller with the public root key by means of the server interface of the second gateway controller.

8. The method as claimed in claim 1, wherein each gateway controller of the plurality of gateway controllers is connected to one or more controllers via a first bus system; and/or
wherein each gateway controller of the plurality of gateway controllers is connected to one or more gateway controllers via a second bus system.

9. The method as claimed in claim 1, the method further comprising:
adapting the reception request depending on the confirmation message by means of the first gateway controller.

10. The method as claimed in claim 1, the method further comprising:

determining a transmission/reception specification of one of the plurality of gateway controllers by means of the first gateway controller, wherein the one of the plurality of gateway controllers is connected to the first gateway controller via a first bus system; and/or creating the reception request depending on a reception specification of the determined transmission/reception specification of the one of the plurality of gateway controllers by means of the first gateway controller; and/or creating the transmission offer depending on a transmission specification of the determined transmission/reception specification of the one of the plurality of gateway controllers by means of the first gateway controller.

11. The method as claimed in claim 1, the method further comprising:
determining a transmission/reception specification of one of the plurality of gateway controllers by means of the second gateway controller, wherein the one of the plurality of gateway controllers is connected to the second gateway controller via a first bus system; and/or
creating the transmission offer depending on a transmission specification of the determined transmission/reception specification of the one of the plurality of gateway controllers by means of the second gateway controller.

12. The method as claimed in claim 1, the method further comprising:
setting up a communication connection between the client interface of the first gateway controller and the server interface of the second gateway controller via the second bus system, wherein the communication preferably takes place dynamically using a service discovery communication protocol of the second bus system.

13. The method as claimed in claim 1, the method further comprising:
disconnecting the communication connection between the client interface of the first gateway controller and the server interface of the second gateway controller via the second bus system when the client interface of the first gateway controller has communicated a confirmation message for all reception requests to the server interface of the second gateway controller.

14. A non-transitory computer-readable medium for securely configuring a plurality of gateway controllers of a vehicle, wherein the computer-readable medium comprises instructions which, when executed on a one or more controllers, cause the one or more controllers to:
receive a reception request from a client interface of a first gateway controller by means of a server interface of a second gateway controller;
sign the reception request with a private key of the server interface of the second gateway controller;
transmit a transmission offer from the server interface of the second gateway controller to the client interface of the first gateway controller, wherein the transmission offer comprises a signed reception request;
verify the signed reception request with a public key of the server interface of the second gateway controller by means of the client interface of the first gateway controller;
receive a confirmation message from the client interface of the first gateway controller by means of the server interface of the second gateway controller, wherein the confirmation message comprises a confirmation or a rejection of the transmitted transmission offer by the first gateway controller, wherein the confirmation message is signed with a private key of the client interface of the first gateway controller;
verify the signed confirmation message with a public key of the client interface of the first gateway controller by means of the server interface of the second gateway controller; and
configure a routing table of the second gateway controller depending on the received confirmation message by means of the second gateway controller when the signed confirmation message was successfully verified by the server interface of the second gateway controller.

15. The computer-readable medium of claim 14, wherein the reception request comprises a nonce value of the client interface of the first gateway controller.

16. The computer-readable medium of claim 15, wherein the nonce value of the reception request is signed with the private key of the server interface of the second gateway controller.

17. The computer-readable medium of claim 16, wherein the transmission offer comprises the signed nonce value of the reception request, a nonce value of the server interface of the second gateway controller, and/or a public key certificate of the server interface.

18. The computer-readable medium of claim 17, wherein the computer-readable medium comprises instructions which, when executed on one or more controllers, cause the one or more controllers to verify the public key certificate of the server interface of the second gateway controller with a public root key by means of the client interface of the first gateway controller.

19. A vehicle comprising:
a plurality of gateway controllers, including a first gateway controller and a second gateway controller, the first gateway controller including a client interface and the second gateway controller including a server interface, wherein the vehicle is configured to:
receive a reception request from a client interface of a first gateway controller by means of a server interface of a second gateway controller;
sign the reception request with a private key of the server interface of the second gateway controller;
transmit a transmission offer from the server interface of the second gateway controller to the client interface of the first gateway controller, wherein the transmission offer comprises a signed reception request;
verify the signed reception request with a public key of the server interface of the second gateway controller by means of the client interface of the first gateway controller;
receive a confirmation message from the client interface of the first gateway controller by means of the server interface of the second gateway controller, wherein the confirmation message comprises a confirmation or a rejection of the transmitted transmission offer by the first gateway controller, wherein the confirmation message is signed with a private key of the client interface of the first gateway controller;
verify the signed confirmation message with a public key of the client interface of the first gateway controller by means of the server interface of the second gateway controller; and
configure a routing table of the second gateway controller depending on the received confirmation message by means of the second gateway controller when the signed confirmation message was successfully verified by the server interface of the second gateway controller.

20. The vehicle of claim 19:
wherein the reception request comprises a nonce value of the client interface of the first gateway controller;
wherein the nonce value of the reception request is signed with the private key of the server interface of the second gateway controller;
wherein the transmission offer comprises the signed nonce value of the reception request, a nonce value of the server interface of the second gateway controller, and/or a public key certificate of the server interface; and
wherein the vehicle is further configured to verify the public key certificate of the server interface of the second gateway controller with a public root key by means of the client interface of the first gateway controller.

\* \* \* \* \*